United States Patent
Davis et al.

(10) Patent No.: US 7,121,729 B2
(45) Date of Patent: Oct. 17, 2006

(54) DAMPED BEARING CAGE

(75) Inventors: Lawrence P. Davis, Phoenix, AZ (US); Dennis W. Smith, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 176 days.

(21) Appl. No.: 10/802,072

(22) Filed: Mar. 15, 2004

(65) Prior Publication Data

US 2005/0201649 A1    Sep. 15, 2005

(51) Int. Cl.
*F16C 33/38* (2006.01)
(52) U.S. Cl. ........................... 384/523; 384/526
(58) Field of Classification Search ........ 384/523–534, 384/572–580
See application file for complete search history.

(56) References Cited

U.S. PATENT DOCUMENTS

| | | | |
|---|---|---|---|
| 3,918,778 A | 11/1975 | Jacobson et al. | |
| 5,165,805 A | * 11/1992 | Bauer et al. | ........ 384/572 |
| 5,247,855 A | 9/1993 | Alten et al. | |
| 5,522,815 A | 6/1996 | Durgin, Jr. et al. | |
| 5,816,373 A | 10/1998 | Osterberg et al. | |
| 5,873,438 A | 2/1999 | Osterberg et al. | |
| 6,196,721 B1 | 3/2001 | Farkaly | |
| 6,358,153 B1 | 3/2002 | Carlson et al. | |
| 6,422,083 B1 | 7/2002 | Hobbs | |
| 6,641,119 B1 | 11/2003 | Kato | |
| 6,682,219 B1 | 1/2004 | Alam et al. | |
| 2003/0077018 A1 | 4/2003 | Kato et al. | |

FOREIGN PATENT DOCUMENTS

GB          958547 A       5/1964

OTHER PUBLICATIONS

PCT International Search Report, PCT/US2005/008718, EP International Search Authority, Jun. 21, 2005, 7 pages.

* cited by examiner

*Primary Examiner*—Lenard A. Footland
(74) *Attorney, Agent, or Firm*—Ingrassia Fisher & Lorenz (57) ABSTRACT

Method and apparatus are provided for reducing vibration in bearings. There are provided first and second bearing rings with races, rotating members rollingly engaging both first and second bearing races, a cage for aligning the rotating members between the first and second bearing races, and vibration reduction means coupled to the cage. The vibration reduction means preferably comprises one or more resonant spring-mass combinations mounted in or on the cage. Damping means is preferably included with the resonant spring-mass combinations. The resonant frequencies of the unmodified bearing cage are first determined and then the spring-mass combinations tuned so that the spring-mass combinations when attached to the cage absorb vibrational energy that would otherwise excite cage vibrations. By selecting the type of spring-mass combination different vibrational modes can be suppressed and/or controlled.

6 Claims, 9 Drawing Sheets

FIG. 17

DAMPED BEARING CAGE

TECHNICAL FIELD

The present invention generally relates to vibration damping, and more particularly to vibration damping in bearing cages.

BACKGROUND

Figure 1A:
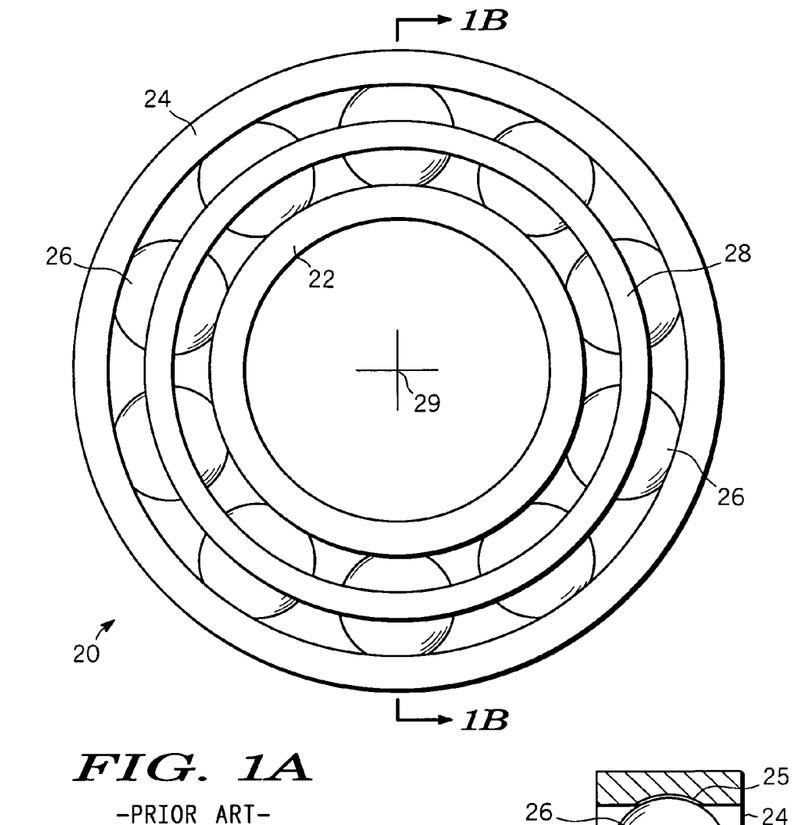
FIG. 1A is a plan view of a typical prior art bearing having a ball cage and FIG. 1B is a cross-sectional view through the bearing of FIG. 1A.
Figure 1B:
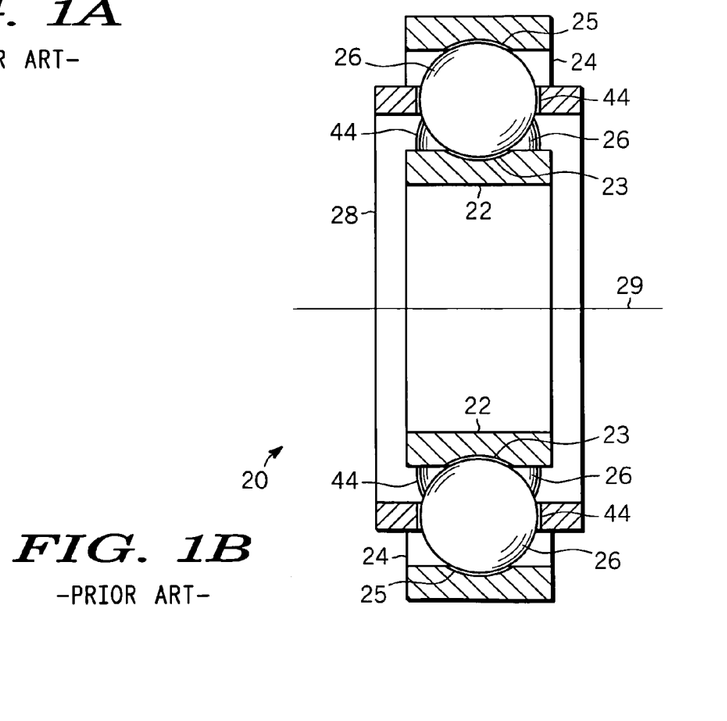
Figure 2:
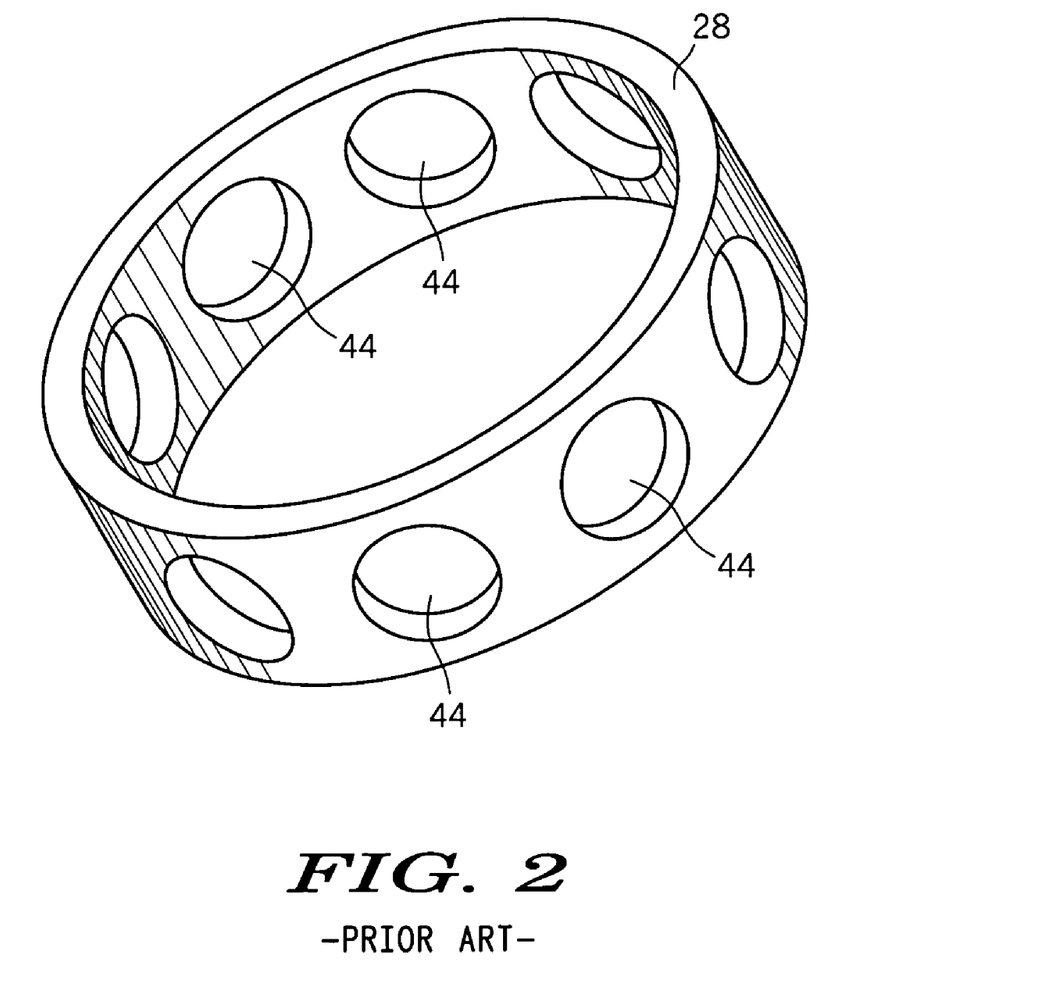
FIG. 2 is a perspective view of the prior art ball cage of the bearing of FIGS. 1A–B with the balls and races omitted

Ball bearings typically use a ball separator or cage to space the balls in the annulus between the inner and outer races, which are part of the inner and outer rings. FIG. 1A is a plan view and FIG. 1B is a cross-sectional view through a typical prior art bearing 20 having inner ring 22 with inner race 23, outer ring 24 with outer race 25, balls 26 and ball cage 28. FIG. 2 is a perspective view of ball cage 28 of bearing 20 with rings 22, 24 and balls 26 omitted. The cage is positioned through contacts with the balls and either the inner or outer race. The cage keeps the balls approximately evenly spaced around the bearing and reduces friction and wear by preventing contact between adjacent balls. However, the cage is an additional dynamic element in the system. It is free to move in all degrees of freedom, that is, rotationally, torsionally and translationally, within limits constrained by ball and race contacts. Because of this freedom of motion, the cage can experience unwanted oscillations known as instabilities. These instabilities can occur as linear oscillations, as torsional oscillations and/or elliptical oscillations known as whirl modes. When a cage becomes unstable it dissipates energy which increases the drag torque of the bearing, increases cage wear at the contact points and increases bearing operating temperatures, all of which can have a negative impact on bearing life. Bearing vibrations can also be transmitted to the equipment being supported by the bearing and the base supporting the bearing, thereby having a negative impact on the overall system performance.

Several approaches have been used to minimize cage or other bearing instabilities. For example, judicious selection of race and ball pocket clearances and proper lubrication can reduce some cage instabilities. Improvement can also be had by using more complex bearing structures such as are described, for example, in U.S. Pat. No. 3,918,778 to Jacobson et al, and U.S. Pat. No. 6,196,721 B1 to Farkaly. Other approaches external to the bearings have also been used to reduce overall vibrations such as for example are described in U.S. Pat. No. 6,682,219 B2 to Alam et al; U.S. Pat. No. 5,247,855 to Alten et al; U.S. Pat. No. 6,358,153 B1 to Carlson et al; U.S. Pat. No. 6,422,083 B1 to Hobbs; U.S. Pat. No. 6,641,119 B2 to Kato; U.S. Pat. No. 5,816,373 to Osterberg et al; U.S. Pat. No. 5,873,438 to Osterberg et al; and U.S. Pat. No. 5,522,815 to Schierling et al. Nevertheless, such approaches are only partially successful in controlling bearing cage instabilities and can be unduly complex and more expensive than is desired. Thus, there continues to be a need for effectively and inexpensively reducing cage instabilities in bearings Accordingly, it is desirable to provide an improved bearing cage structure that can damp unwanted cage oscillations. In addition, it is desirable that the improved cage structure be simple, rugged and reliable and involve minimal modification of the overall bearing structure and size. Furthermore, other desirable features and characteristics of the present invention will become apparent from the subsequent detailed description and the appended claims, taken in conjunction with the accompanying drawings and the foregoing technical field and background.

BRIEF SUMMARY

An apparatus is provided for reducing vibration in bearings. The apparatus comprises first and second bearing rings, rotating members rollingly engaging races on both first and second bearing rings, a cage for aligning the rotating members between the first and second bearing rings, and vibration reduction means coupled to the cage. The vibration reduction means preferably comprises one or more resonant spring-mass combinations mounted in or on the cage. Damping means is preferably included with the resonant spring-mass combinations.

A method is provided for providing reduced vibration bearings. The method comprises determining resonant frequencies of an unmodified bearing cage, selecting resonant spring-mass combinations tuned so that when attached to the cage the spring-mass combinations absorb vibrational energy that would otherwise excite cage vibrations, then forming a complete bearing by assembling the bearing rings, rolling members and the modified cage with the selected spring-mass combinations coupled thereto.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 3:
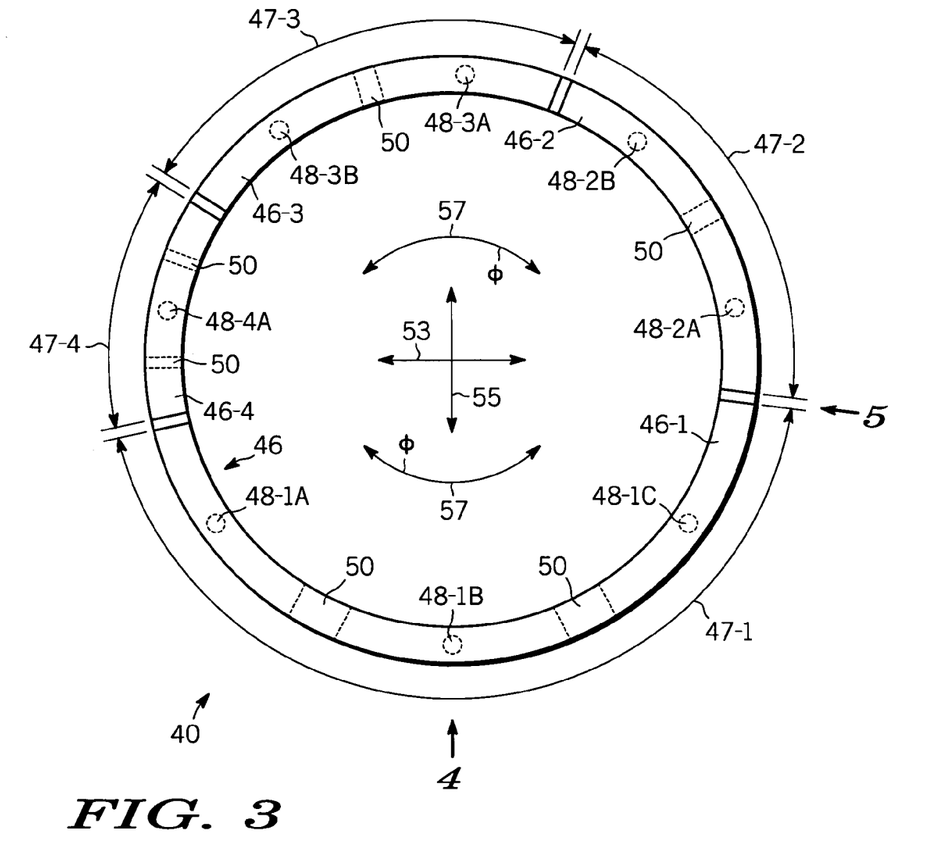
FIG. 3 is a plan view of a ball bearing cage according to a first embodiment of the present invention.
Figure 4:
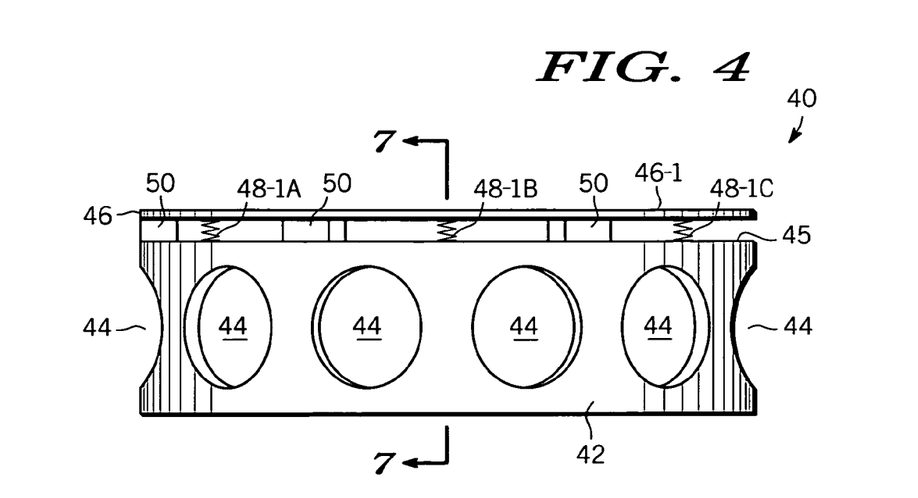
FIGS. 4–5 are first and second side views of the ball bearing cage of FIG. 3 showing further details.
Figure 5:
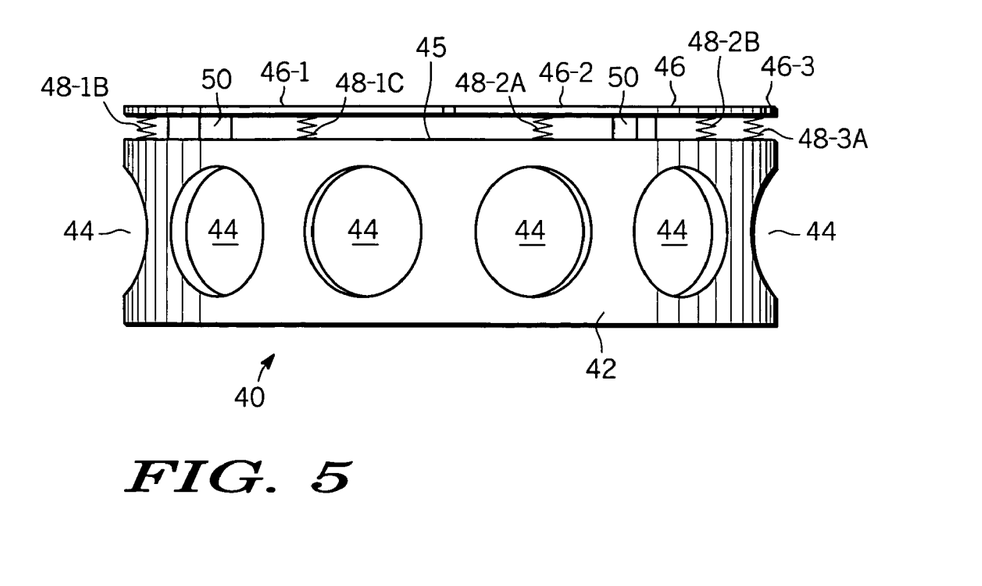
Figure 6:
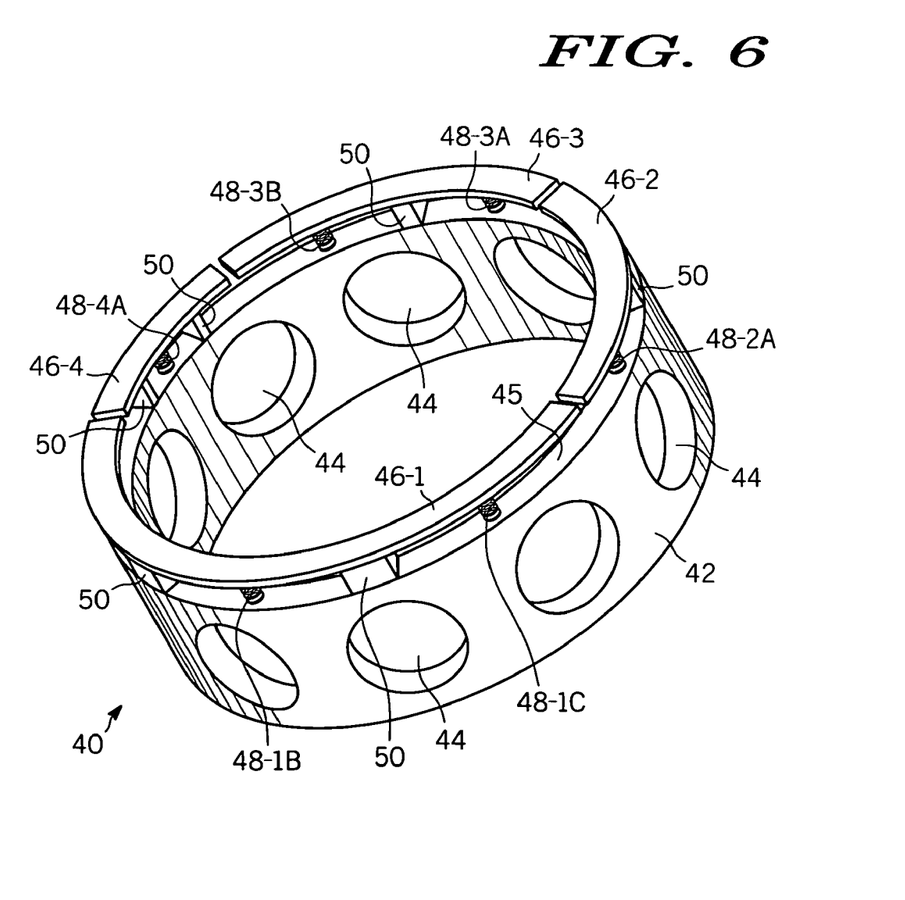
FIG. 6 is a perspective view of the ball bearing cage of FIGS. 3–5.
Figure 7:
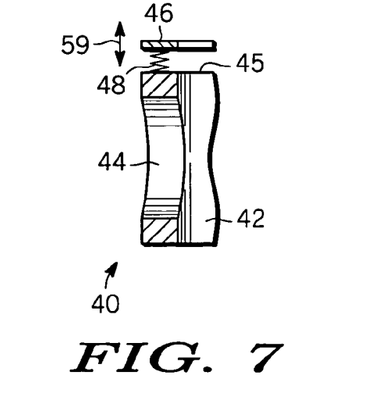
FIG. 7 is a cross-sectional view through a portion of the ball bearing cage of FIG. 4.

FIG. 3 is a plan view of ball bearing cage assembly 40 according to a first embodiment of the present invention, FIGS. 4–5 are first and second side views of ball bearing cage assembly 40 of FIG. 3 showing further details, FIG. 6 is an isometric view of assembly 40 and FIG. 7 is a partial cross-section through assembly 40 as indicated in FIG. 4. Assembly 40 comprises bearing cage 42 with holes 44 to accommodate the balls of the ball bearing. The bearing balls and rings are not shown. Mounted above rim 45 of bearing cage 42 is segmented annular ring 46. In the example of FIGS. 3–5, ring 46 has 4 segments 46-1, 46-2, 46-3, 46-4 with angular sizes 47-1, 47-2, 47-3, 47-4, respectively, but this is merely for convenience of description. Any number of ring segments from 1 to N could be used and of various sizes and mass, depending upon the frequencies intended to be resonated. Ring 46 is coupled to rim 45 of cage 42 by one or more springs 48. For example, ring segment 46-1 is coupled to rim 45 by three springs 48-1A, 48-1B, 48-1C, but this is merely for convenience of explanation and not intended to be limiting. Different segments are coupled to rim 45 by different numbers of springs 48, e.g., segment 46-2 by springs 48-2A and 48-2B, segment 46-3 by springs 48-3A and 48-3B and segment 46-4 by single spring 48-4A. The number of springs and the spring characteristics will depend upon the cage vibration modes desired to be resonated. Springs 48 and ring segments 46 form spring-mass combinations. Ring segments 46 form a distributed mass. As will be explained in more detail later, by suitable choices of segment masses and spring characteristics, these spring-mass combinations can be designed to resonate at specific bearing cage frequencies, thereby transferring the cage vibrations to the suspended masses of ring segments 46. By use of suitable energy absorbers 50 these oscillations can also be rapidly damped. This reduces the oscillations of cage 42, thereby improving bearing performance.

In addition to the springs 48 and ring segment masses 46, assembly 40 also desirably but not essentially includes damper pads 50 located between ring segments 46 and rim 45. Pads 50 are desirably of a compressible elastomeric material such that, as ring segments 46 begin to vibrate in resonance or anti-resonance with ring 42, pads 50 absorb vibrational energy, thereby damping the cage vibrations. The number, size and material properties of pads 50 will depend upon the cage vibration frequencies intended to be damped. An example of a suitable pad material is Type 242F04 manufactured by the 3M Corporation of St. Paul, Minn. Pads 50 can also act to bias springs 48.

Springs 48 in FIGS. 3–7 are illustrated as being small coil springs or the like, but this is merely for convenience of description and not intended to be limiting. As will be subsequently explained different types of springs can be used to control the degrees of vibrational freedom in which a given spring-mass segment may vibrate. For example, where springs 48 are coil springs, then ring segments 46 may vibrate (see FIG. 3) in X and Y directions as shown by arrows 53, 55 respectively and rotationally or torsionally in angular direction Φ as shown by arrows 57, and also (see FIG. 7) in the Z-direction as shown by arrows 59. Thus the arrangement of FIGS. 3–7 maybe said to have unlimited vibrational degrees of freedom, that is, X, Y, Z and Φ.

Figure 8:
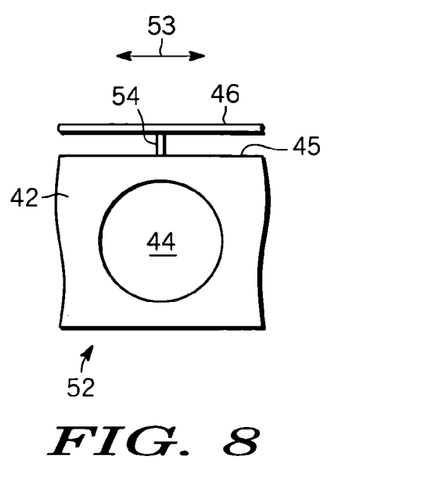
FIGS. 8–10 are enlarged side views of a segment of a ball cage according to other embodiments of the present invention.
Figure 9:
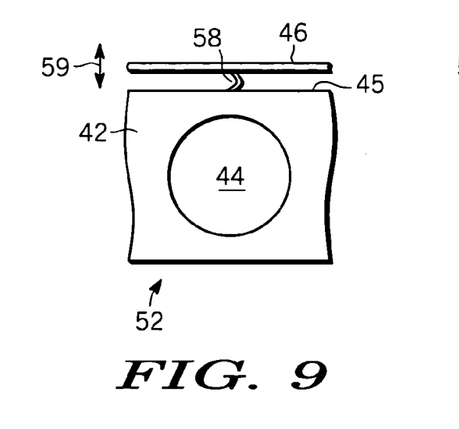

FIGS. 8–9 are enlarged side views of segment 52 of ball cage 42 according to other embodiments of the present invention illustrating the use of different types of springs. In FIG. 8, one or more ring segments 46 are suspended from rim 45 by substantially straight spring(s) 54 coupling ring segments 46 to rim 45. If spring 54 has a round cross-section like a wire, then ring segments 46 may move in X, Y and Φ directions 53, 55, 57 but not in Z direction 59. If spring(s) 54 have a rectangular cross section, that is, like a flat leaf-spring and the principal faces of multiple leaf spring(s) 54 disposed around rim 45 of cage 42 are oriented in the same direction, e.g., parallel to the X-axis, then such ring segments can move in X direction 53 generally perpendicular to the broad face of leaf spring(s) 54, but not in the Y, Φ or Z directions. By orienting the leaf springs of different ring segments in different directions, some segments can be free to move in X direction 53, and some in Y direction 55 (or any other 2-D translational direction) but not in Z direction 59 or Φ direction 57. In FIG. 9, one or more ring segments 46 are suspended from rim 45 by bent or angled spring(s) 58. Depending upon whether spring(s) 58 are wire-like or flat blade-like, the same discussion applies as for spring(s) 54 of FIG. 8, except that segments 46 with springs 58 may now also move in Z direction 59. Thus, cage assembly 40 allows the degrees of vibrational freedom of various mass-spring combinations provided by ring segments 46 and springs 48, 54, 58 to be tailored to the specific needs of the designer for resonating and damping undesirable vibrations of cage 42.

Figure 10:
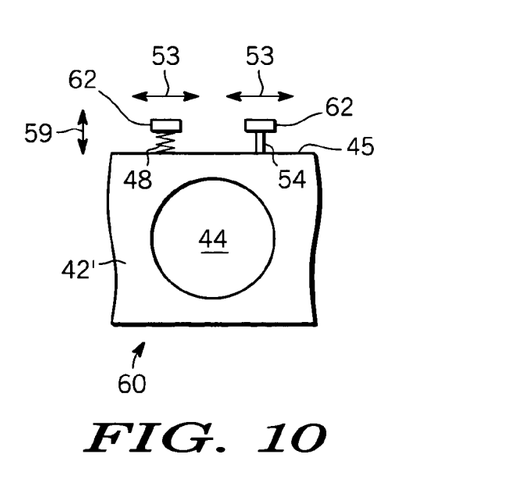
Figure 11:
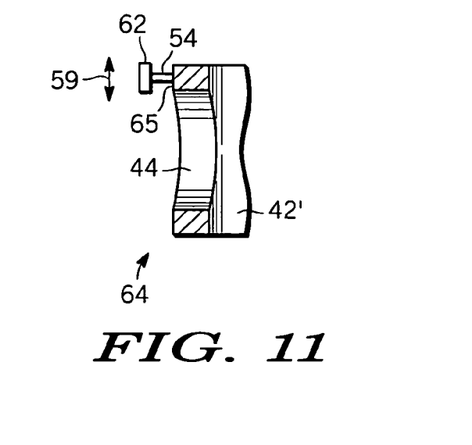
FIG. 11 is a cross-sectional view similar to FIG. 7 but according to another embodiment of the present invention.
Figure 12:
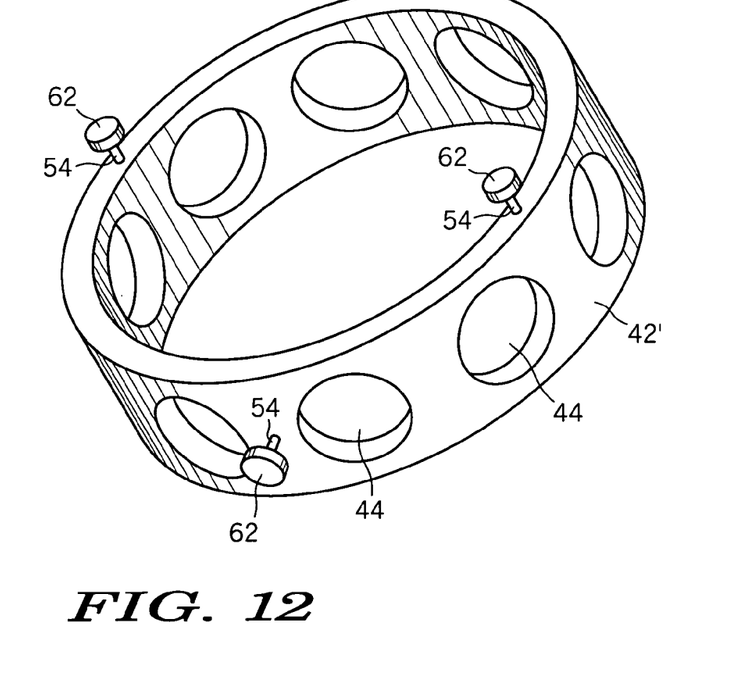
FIG. 12 is a perspective view of a ball bearing cage incorporating features illustrated in FIGS. 10–11.

FIGS. 10–12 illustrate arrangements for resonating and damping cage vibrations according to further embodiments of the present invention. FIG. 10 is an enlarged side view of segment 60 of ball cage 42' (similar to cage 42 but without segments 46), FIG. 11 is a cross-sectional view similar to FIG. 7 of segment 64 of cage 42' and FIG. 12 is a perspective view of cage 42'. FIG. 10 illustrates a situation where the distributed mass provided by segmented ring 46 is replaced by one or more discrete mass elements 62. In this example, discrete mass elements 62 are shown as being disk-shaped, e.g., like hockey pucks, but this is merely for convenience of description and not intended to be limiting. Mass elements 62 may have any convenient shape. Further, while mass elements 62 are illustrated as each being suspended by single spring 48, 54 any number of springs and any desired combination of different spring types may also be used, depending upon the needs of the user and the desired degrees of vibrational freedom. For example, the combination of spring 48 and mass 62 (hereafter spring-mass combination 48, 62) is capable of vibration in X, Y, Z and Φ directions. Spring-mass combination 54, 62 is capable of vibration in X, Y and Φ directions if spring 54 has a circular cross-section and one translational direction (X or Y) if spring 54 is a flat leaf-type spring, but not in the Z direction (perpendicular to the surface of cage 42' on which spring 54 is mounted). While spring mass combinations 48, 62 and 54, 62 are shown in FIG. 10 as being adjacent, this is merely for convenience of illustration and not intended to be limiting or imply that such proximity is necessarily desirable. The spacing and location of such spring-mass combinations will be chosen by the designer depending upon the vibration modes to be resonated. FIG. 11 is a view similar to FIG. 7 but for an alterative placement of spring-mass combination 54, 62 (or 48, 62). In FIG. 11, spring-mass combination 54, 62 extends from side face 65 of cage 42. This allows further control over the vibrational degrees of freedom and direction of vibration of resonant elements 54, 62 (or 48, 62). FIG. 12 is a perspective view of ball bearing cage 42' incorporating spring-mass elements 54, 62 (or 48, 62) illustrated in FIGS. 10–11.

Figure 13:
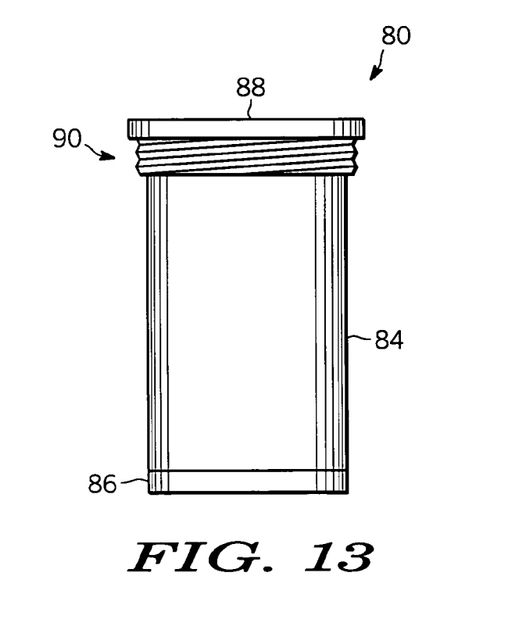
FIG. 13 is side view and FIG. 14 is a simplified cross-sectional view of a self-contained tuned mass damper suitable for use with a bearing cage.
Figure 14:
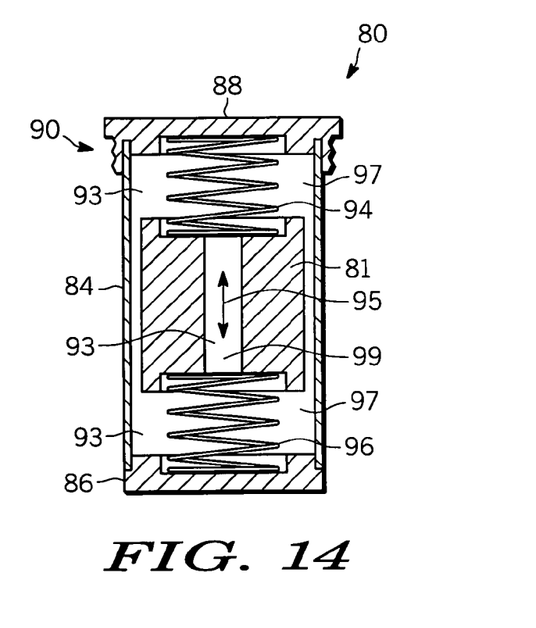

FIG. 13 is side view and FIG. 14 is a simplified cross-sectional view of self-contained tuned mass damper (TMD) 80 suitable for use with a bearing cage of the present invention to damp out the vibrations thereof. Tuned mass dampers (TMDs) are known in the art and described in commonly assigned U.S. Pat. No. 5,816,373 and 5,873,438 to Osterberg et al, which are incorporated herein by reference. The illustrations in FIGS. 13–14 and the description thereof that follows here are simplified and reference should be had to the above-noted patents for further internal design features. TMD 80 has outer shell 84 closed by end caps 86, 88. Threads 90 are conveniently provided for attaching TMD 80 to a bearing cage. However, threads 90 are not essential and illustration thereof is not intended to be limiting. Any suitable means of attaching tuned mass dampers 80 to bearing cages may be used. TMD 80 has therein mass 81 suspended between springs 94, 96 that are retained by end caps 88, 86 respectively. Mass 81 is free to move in the direction of arrows 95. Spaces 97, 99 within outer shell 84 and in and around mass 81 are filled with damping fluid 93. Either liquids or gases may be used for damping fluid 93.

Figure 15:
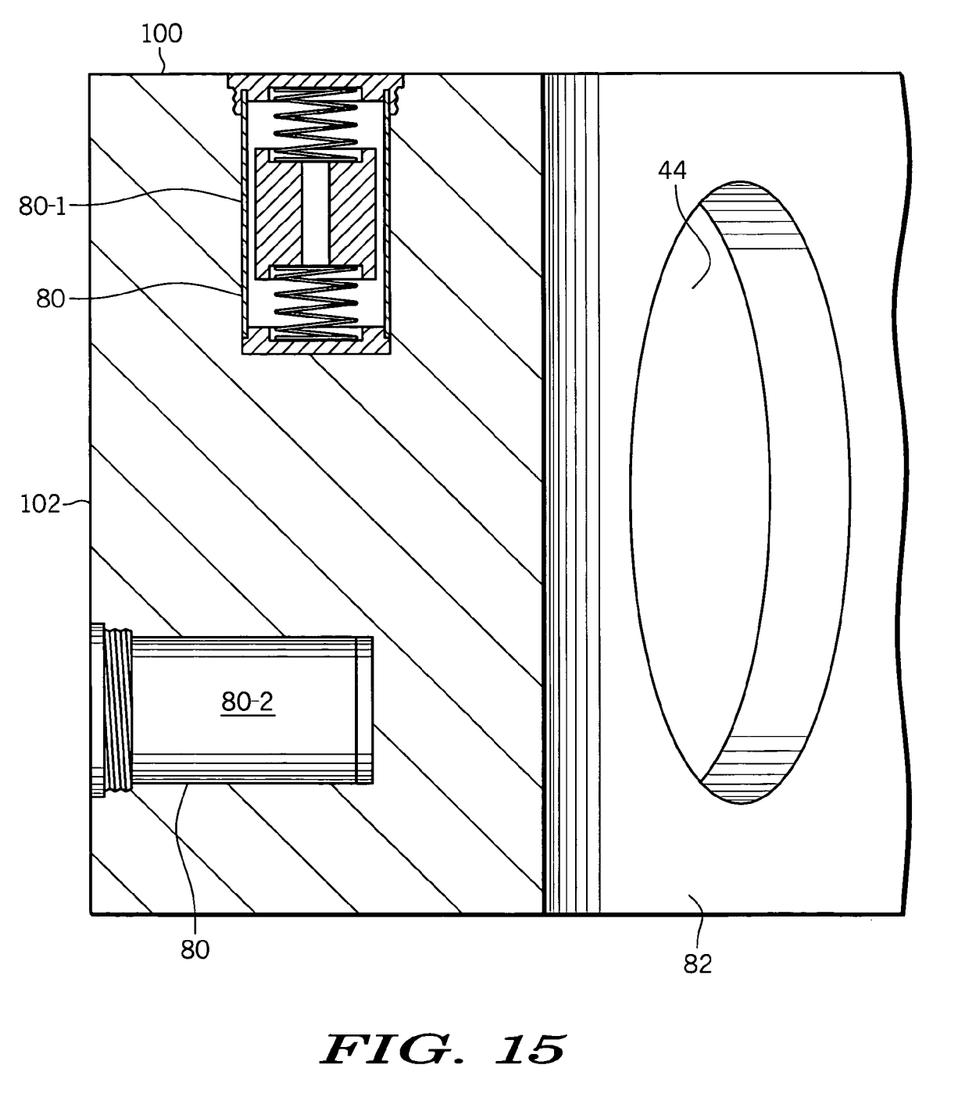
FIGS. 15–16 are partial cross-sectional views of a bearing cage of the present invention with the tuned mass dampers of FIGS. 13–4 inserted at various angles into the cage wall, according to a still further embodiment of the present invention.
Figure 16:
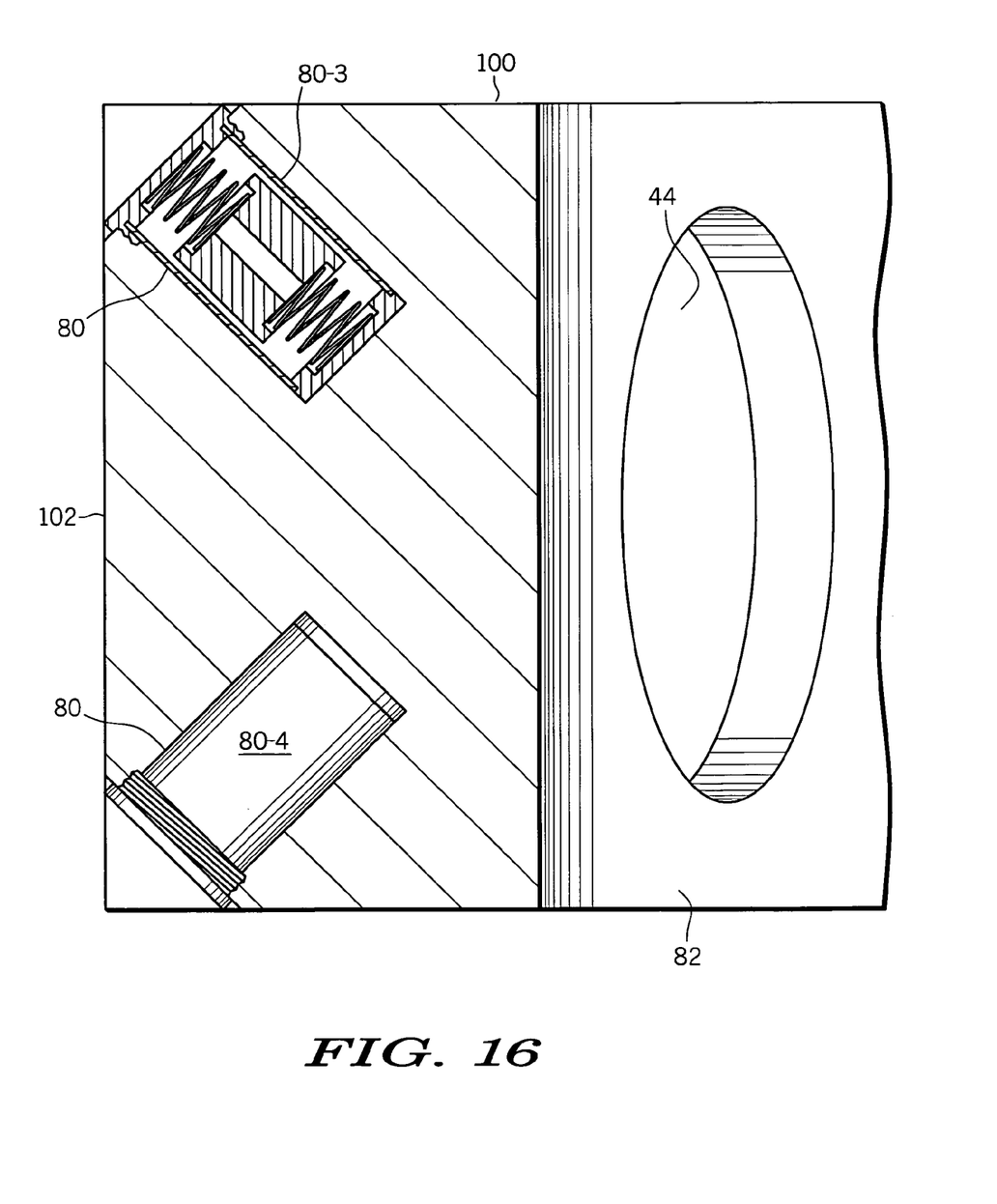

FIGS. 15–16 are partial cross-sectional views of bearing cage 82 according to a further embodiment of the present invention. Cage 82 is analogous to cage 42, 42' but without segmented ring 46. TMDs 80 of FIGS. 13–14 are inserted at various angles into the walls of cage 82. In FIG. 15, TMD 80-1 is inserted approximately normal to face 100 of cage 82 and TMD 80-2 is inserted in face 102 substantially at right angles to TMD 80-1. Face 100 of cage 82 is analogous to face 45 of cage 42 (see FIGS. 4–7) and face 102 is analogous to face 65 of cage 42' (see FIG. 11). In FIG. 16, TMDs 80-3 and 80-4 oriented at approximately 45 degrees with respect to TMDs 80-1, 80-2. While FIGS. 15–16 illustrate TMDs 80 as being inserted in bearing cage 82 at particular angles, this is not intended to be limiting and TMDs 80 may be inserted at whatever angle is needed to damp particular vibrational modes of the cage. Because the harmonic motion of each TMD 80 is essentially linear as illustrated by arrows 95 in FIG. 14, each TMD 80 damps vibrations in a single degree of freedom. The particular direction in which it is effective with respect to bearing cage 82 can therefore be selected by choosing the orientation of TMDs 80 with respect to bearing cage 82. FIGS. 15–16 illustrate non-limiting examples of the various choices that can be used by a designer to suppress different vibrational modes in bearing cage 82.

Figure 17:
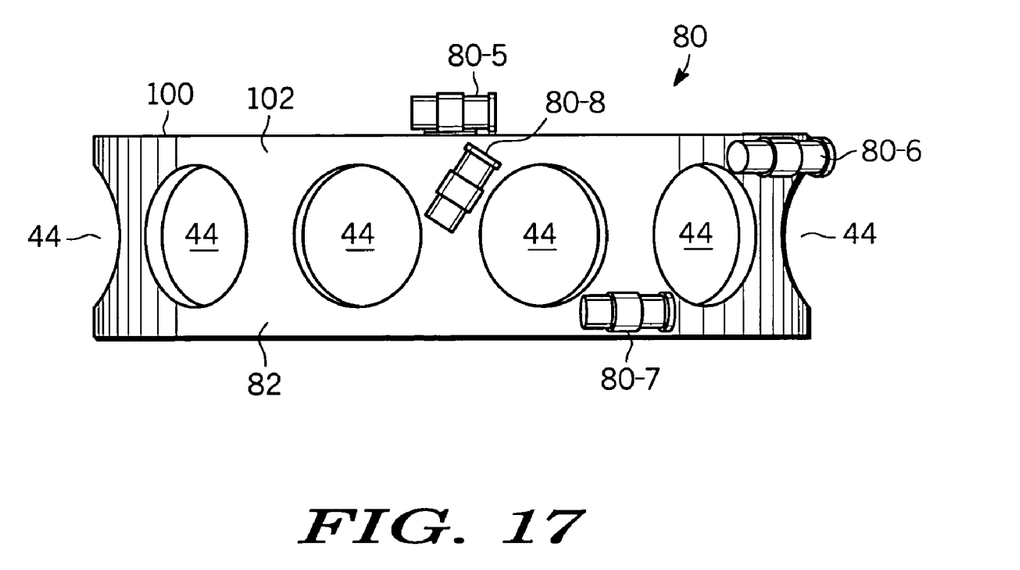
FIG. 17 is a side view of a ball cage according to a yet further embodiment of the present inventions utilizing the tuned mass dampers of FIGS. 13–14.

FIG. 17 is a view of bearing cage 82, similar to FIG. 4 but illustrating a still further embodiment of the present invention in which several TMD's 80 are mounted externally on surfaces 100 and/or 102 of cage 80 rather than internally within the walls of cage 82. Any convenient means of attaching TMDs 80 to surfaces 100, 102 or other cage surfaces may be used. TMDs 80 of FIG. 17 are shown as being attached at different angles on different surfaces to illustrate how additional vibrational modes may be suppressed. For example, TMDs 80-6, 80-7 and 80-8 are mounted so that their vibrational vectors 95 (see FIG. 14) are tangentially oriented with respect to cage 82, thus allowing them to assist in suppressing rotational or torsional vibrations, in addition to particular translational vibrations parallel to their individual motion vectors 95. TMD 80-8 is illustrated as being mounted at an angle with respect to the circumferential or tangential direction of cage 82, thus providing additional flexibility, for example, in suppressing swirl modes. FIGS. 15–17 have illustrated the use of TMDs 80 in different orientations and attachments. Persons of skill in the art will understand based on the description herein that multiple TMDs may be mounted in different orientations and locations on the same bearing cage, some internally, some externally or a combination thereof, according to the vibrational modes desired to be suppressed.

The mass, spring and damping constants needed to damp bearing cage vibrations may be determined using means well known in the art. See for example, Chapter 6, "Dynamic Vibration Absorbers and Auxiliary Mass Dampers" in Harris' *Shock and Vibration Handbook (5th Edition)*, Edited by C. M. Harris and A. G. Piersol, McGraw-Hill, N.Y. 2002. A convenient rule of thumb is that a mass ratio of 5% will yield a damping ratio of about 5%, however, larger or smaller mass ratios may also be used. The mass ratio is the ratio of the damping mass to the mass being damped. In general, the vibrational modes of a bearing cage can be complex and an iterative design approach is sometimes required. That is, do a preliminary design according to the methods described for example, in Harris (ibid), build and test the results, refine the design and test again. Such iterative design approaches are well understood by persons of skill in the art.

While at least one exemplary embodiment has been presented in the foregoing detailed description, it should be appreciated that a vast number of variations exist. For example, while the present invention has been illustrated for ball bearings, this is not intended to be limiting. The present invention applies to all types of bearings in which a cage is used to align the rolling elements or members. Balls as rolling elements or members are merely one example of many different types of rolling elements or rolling members that exist and are used in various types of bearings. Non-limiting examples of other types of bearings to which the present invention applies are roller bearings, thrust bearings, sleeve bearings and so forth that contain cages for aligning the rolling elements or members. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A bearing, comprising:
   a first bearing ring including a race;
   a second bearing ring including a race that is aligned with the first bearing ring race;
   rotating members located between the first and second bearing ring races and bearing thereon;
   an alignment cage located between the first and second bearing rings and having openings therein that locate the rotating members in spaced-apart alignment between the first and second bearing races, the alignment cage having first and second faces between which the openings extend and at least a third face coupling the first and second faces; and
   one or more vibration suppressors coupled to the alignment cage, at least one of the vibration suppressors comprising one or more arc segments coupled to the third face by one or more springs.

2. The bearing of claim 1 wherein the first face is outboard of the rolling members and one or more vibration suppressors are mounted at least in part on the first face.

3. The bearing of claim 1 wherein the arc segment comprises a distributed mass.

4. The bearing of claim 1 wherein the alignment cage is substantially circular.

5. The bearing of claim 1 wherein the arc segment comprises a substantially discrete mass.

6. The bearing of claim 1 further comprising one or more vibration damping pads between the third face and the one or more arc segments.

* * * * *